Patented Nov. 24, 1931

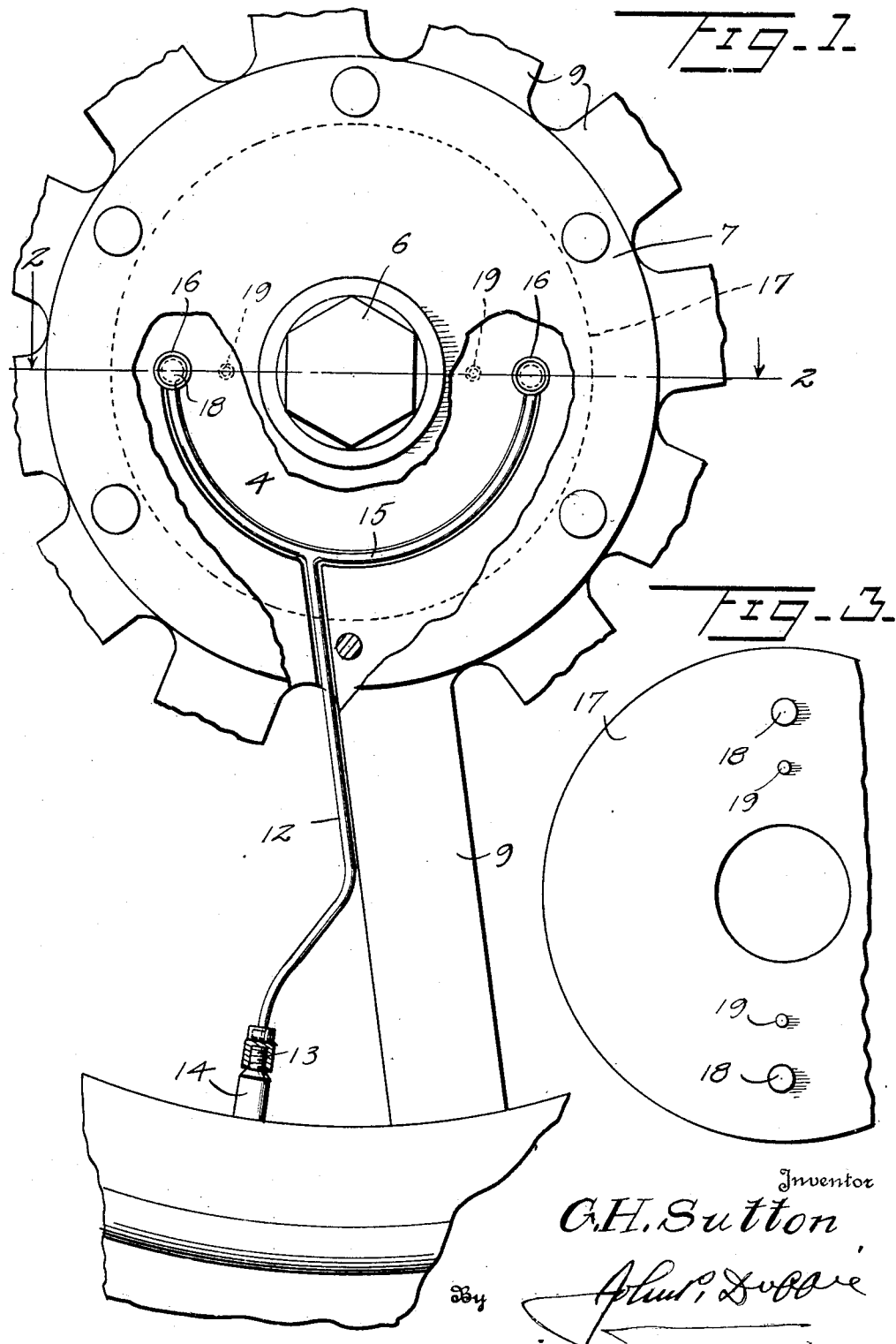

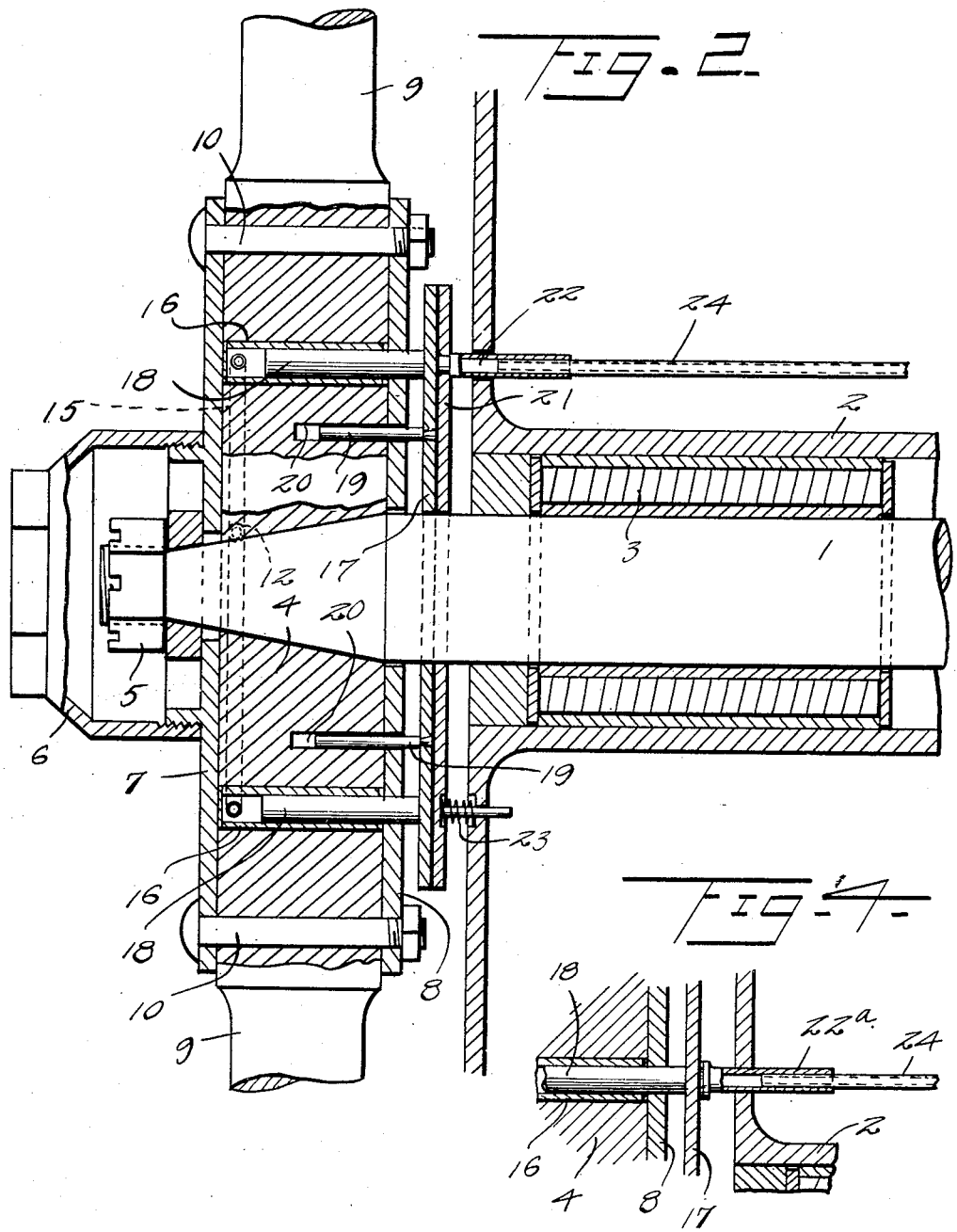

1,833,446

UNITED STATES PATENT OFFICE

GUS HARRIS SUTTON, OF INDEPENDENCE, KANSAS, ASSIGNOR OF ONE-HALF TO ADONIJAH H. SUTTON, OF INDEPENDENCE, KANSAS

AIR PRESSURE INDICATOR FOR AUTOMOBILE TIRES

Application filed November 3, 1928. Serial No. 316,959.

This invention relates to new and useful improvements in air pressure indicators for automobile tires.

The primary object of my invention is to provide a device of this character whereby the air pressure of the tires is indicated or registered on the instrument board of the machine and proper inflation of the tires therefore rendered practical at all times. It is a well known fact that under-inflation of the tires of an automobile is the cause of considerable annoyance, labor and expense and even accidents and these objections can be eliminated through the use of my invention.

A further object of my invention is to provide a device of this character which is simple and economical in construction and highly efficient and durable in use.

With the foregoing and other objects in view that will readily appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation, illustrating the application of my invention.

Figure 2 is a horizontal section, taken on line 2—2 of Figure 1.

Figure 3 is a detail fragmentary face view of one of the annular rings or washers and Figure 4 is a detail fragmentary sectional view of a modified form of my invention.

Referring to the drawings for a more particular description of my invention and in which drawings like parts are designated by like reference characters throughout the several views, the numeral 1 designates the axle, 2 the axle housing, 3 the roller bearing, 4 the hub, 5 the axle nut, 6 the hub cap, 7 and 8 the outer and inner hub flanges, respectively, 9 the spokes, and 10 the transverse connecting bolts between the inner ends of the spokes and the hub flanges. These parts are of the ordinary or approved construction and any further explanation in this regard is deemed unnecessary.

In carrying out my invention, a flexible air tube 12 is screwed at its outer end, as at 13, to the valve stem 14 of the inner tube of the tire and is extended inwardly along the adjacent spoke of the wheel and terminates in a semi-circular portion 15 which embraces the hub 4. The ends 16 of the semi-circular portion 15 of the air tube 12 are situated equal distances from the center of the hub and disposed diametrically opposite each other. The air pressure of the tire is transmitted from the flexible air tube aforesaid to the annular ring or washer 17, through the medium of the diametrically opposed plungers 18, associated with the ends 16 of the air tube. The ring 17 is revolubly mounted on the axle between the hub and axle housing and is provided with a pair of horizontal diametrically spaced pins 19, which project outwardly into corresponding recesses 20 in the hub and permit said ring to move horizontally as well as rotate on the axle. The ring 17 is disposed directly opposite a corresponding annular ring 21 provided adjacent its edge with a plunger 22 and a diametrically opposed equalizing spring 23. The plunger 22 may transmit the air pressure of the inner tube of the tire by means of a fluid in the tube 24 or by a properly constructed steel wire to the pressure gauge on the instrument board of the machine. The pressure gauge may be in the form of a dial with revolving hands or indicators for each wheel.

If desired, the annular ring 21 and equalizing spring 23 may be eliminated, as illustrated in the modified form of my invention shown in Figure 4.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of my invention, as defined in the appended claim.

Having described my invention, what I claim as new and desire to secure by Letters Patent, is:

In an air pressure indicator for automobile tires, the combination with the wheel and axle of an automobile, of a flexible tube connected with the valve stem of the inner tube of the tire and comprising a semi-circular portion with diametrically opposed ends, an annular ring on the axle between the hub of the wheel and the axle housing, plungers carried by said annular ring and working in the diametrically opposed ends of said semi-circular portion, a second annular ring disposed directly opposite and bearing against the first mentioned ring and a plunger carried by said second annular ring, substantially as and for the purpose specified.

In testimony whereof he affixes his signature.

GUS HARRIS SUTTON.